United States Patent [19]
Assini et al.

[11] Patent Number: 4,865,555
[45] Date of Patent: Sep. 12, 1989

[54] CONNECTOR WITH OPEN-ENDED BOARDLOCK

[75] Inventors: John E. Assini; Paula A. Kissinger, both of Harrisburg, Pa.; Lance S. Taylor, Harrisonburg, Va.

[73] Assignee: AMP Incorporated, Harrisburg, Pa.

[21] Appl. No.: 237,642

[22] Filed: Aug. 23, 1988

Related U.S. Application Data

[63] Continuation of Ser. No. 81,208, Aug. 3, 1987, abandoned.

[51] Int. Cl.$^4$ .............................................. H01R 13/74
[52] U.S. Cl. ..................................... 439/82; 439/567; 411/508
[58] Field of Search ............... 411/502, 503, 508–510, 411/913; 439/542, 549, 552–558, 564, 567, 569, 573, 82, 84

[56] References Cited

U.S. PATENT DOCUMENTS

| | | |
|---|---|---|
| 388,443 | 8/1888 | Platt . |
| 2,542,144 | 2/1951 | Kearns ................................. 439/557 |
| 3,217,584 | 11/1965 | Amesbury . |
| 3,271,059 | 9/1966 | Pearson . |
| 3,355,701 | 11/1986 | Biba . |
| 3,449,799 | 6/1969 | Bien ..................................... 411/510 |
| 3,778,755 | 12/1973 | Marks . |
| 3,803,670 | 4/1974 | Johnson ............................... 411/508 |
| 4,017,142 | 4/1977 | Clark et al. . |
| 4,427,316 | 1/1984 | Moore et al. ............................ 403/2 |
| 4,435,031 | 3/1984 | Black et al. ........................... 339/17 |
| 4,512,618 | 4/1985 | Kumar . |
| 4,518,209 | 5/1985 | Negley ................................. 339/14 |
| 4,585,295 | 4/1986 | Ackerman ........................... 339/258 |
| 4,609,242 | 9/1986 | Kemppainen ......................... 339/17 |
| 4,659,156 | 4/1987 | Johnescu ............................. 339/17 |
| 4,679,883 | 7/1987 | Assini et al. ........................ 439/573 |
| 4,721,473 | 1/1988 | Delguidice et al. .................. 339/17 |

FOREIGN PATENT DOCUMENTS

| | | |
|---|---|---|
| 877784 | 9/1942 | France . |
| 1103760 | 6/1956 | France .............................. 411/509 |
| 197804 | 4/1978 | Netherlands . |

*Primary Examiner*—Gary F. Paumen
*Attorney, Agent, or Firm*—David L. Smith

[57] ABSTRACT

An open ended (94) boardlock (82) having a segmented (103) shank (90) is inserted into an aperture (60) of an electrical connector housing (22). The boardlock (82) is subjected to axial compression to radially expand the exposed segmented portion of the shank (20). During radial expansion the free ends (104) of the segments (103) are prevented from touching. The radially expanded segments (103) thus function as spring members deflecting inwardly toward the axis of the boardlock as the connector assembly (20) is secured to a printed circuit board (86) and providing a compliant fit in the mounting aperture (84).

10 Claims, 4 Drawing Sheets

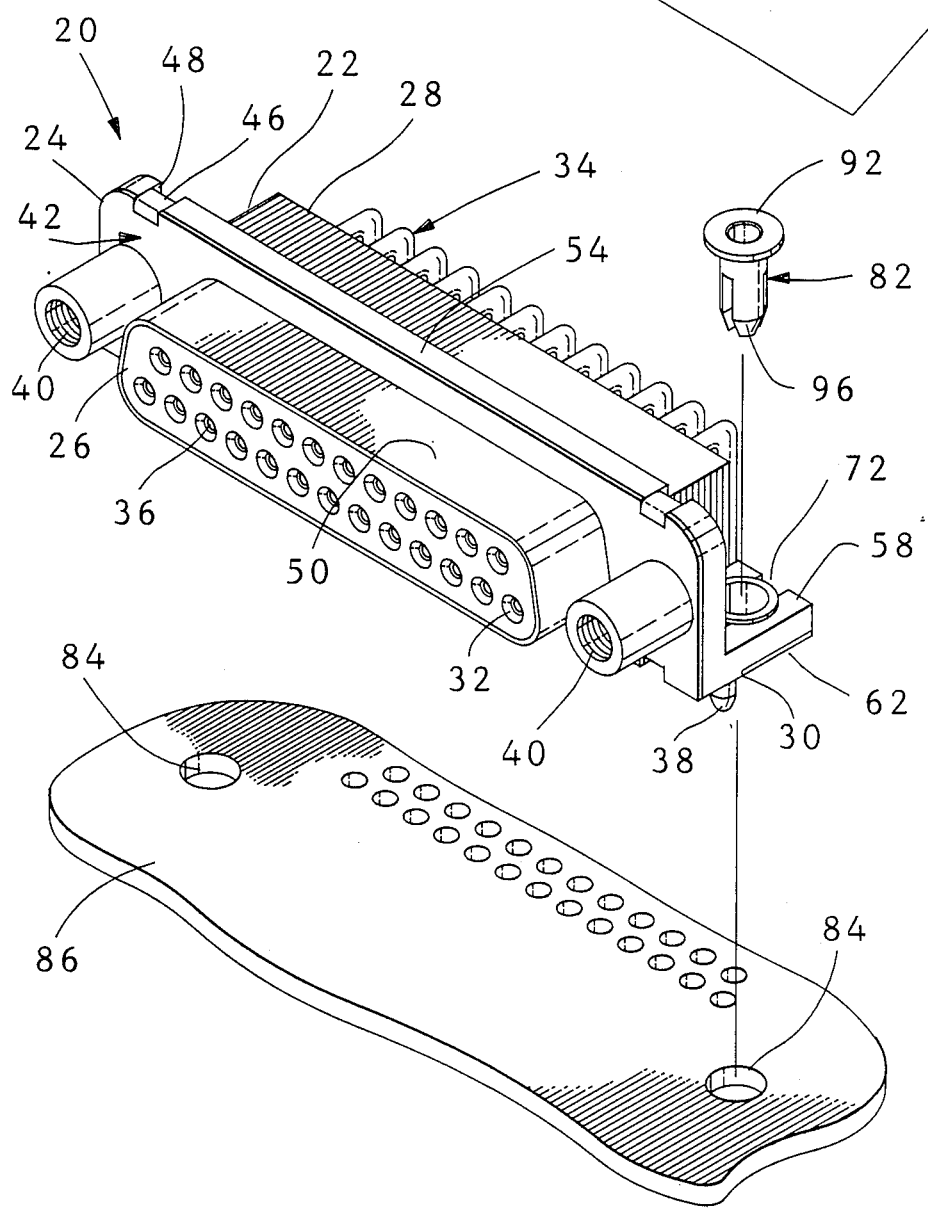

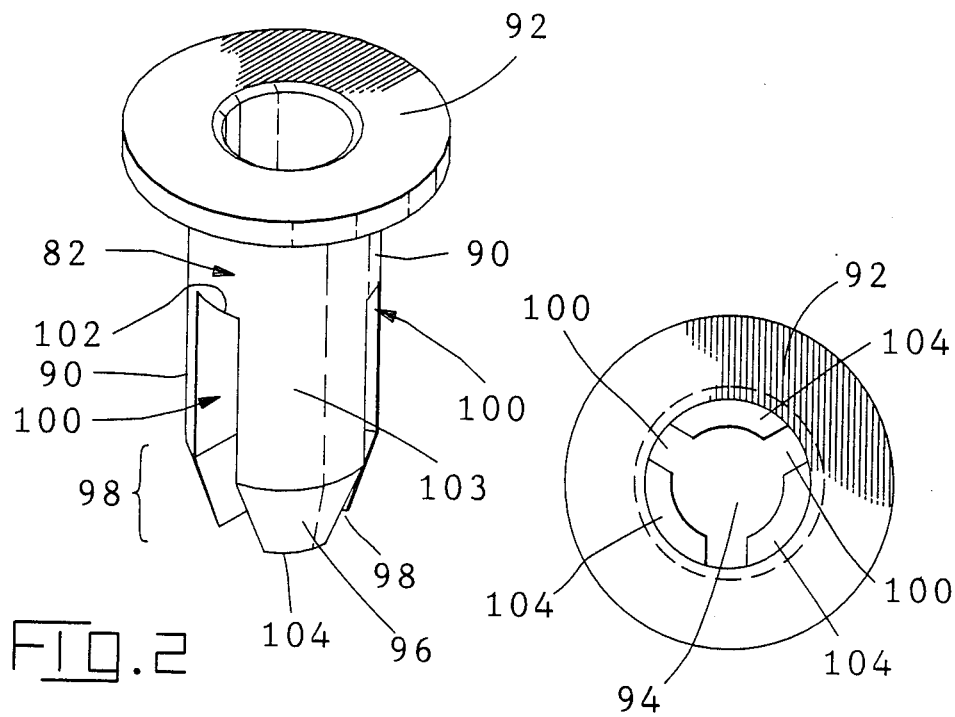
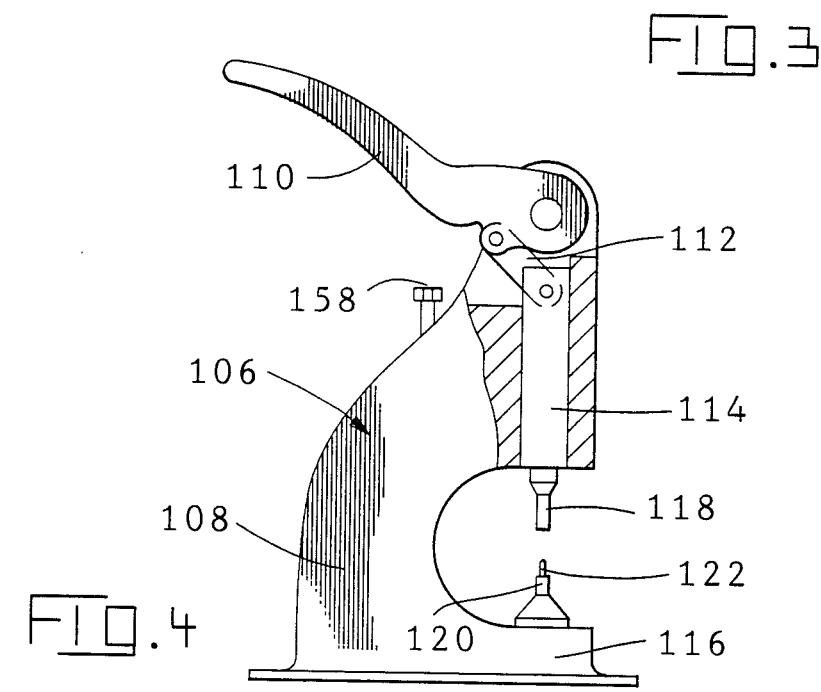

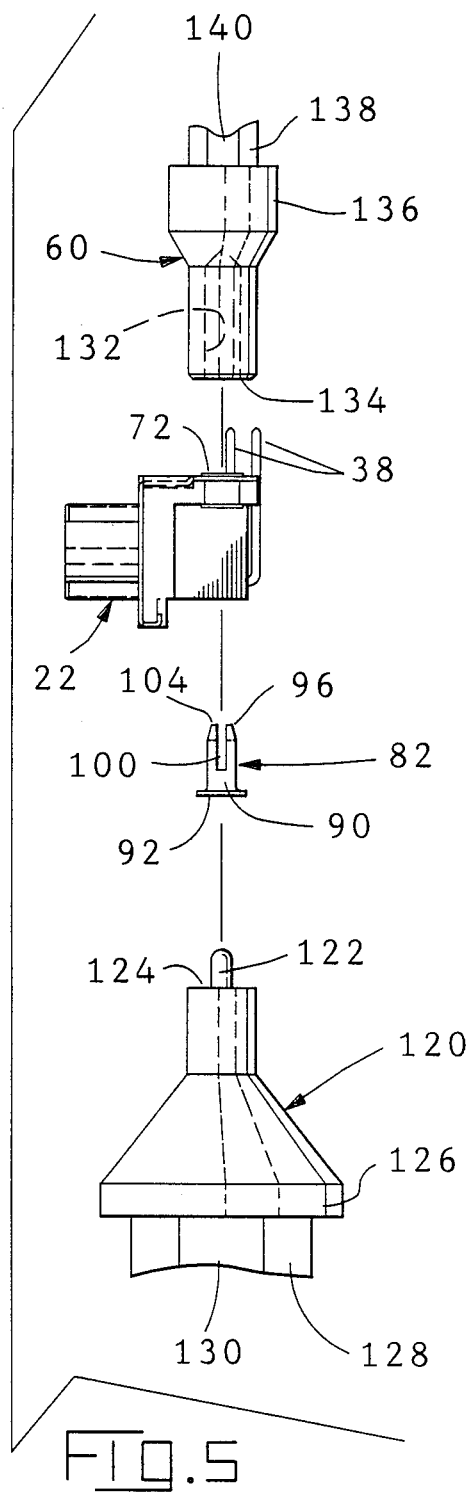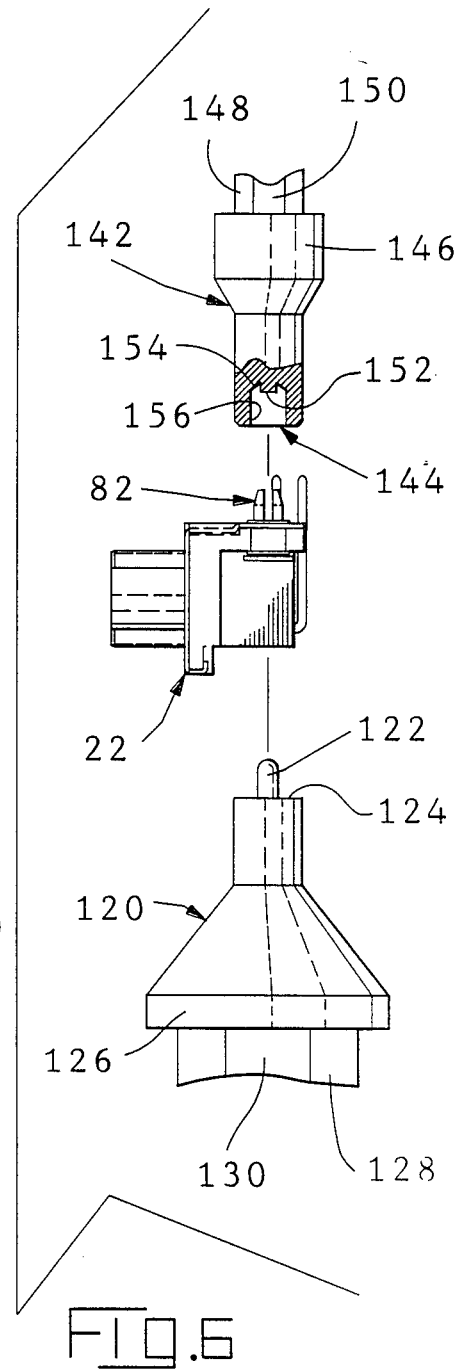

CONNECTOR WITH OPEN-ENDED BOARDLOCK

This application is a continuation of application Ser. No. 81,208 filed Aug. 3, 1987, now abandoned.

BACKGROUND OF THE INVENTION

The present invention relates to means for securing a connector assembly to a printed circuit board and in particular to a connector assembly having specially formed rivets to retain the assembly on a printed circuit board.

U.S. Pat. No. 4,512,618 discloses an electrical connector for mounting to a printed circuit board. The connector includes an elongate dielectric housing having flanges at opposite ends thereof, the flanges having coplanar mounting surfaces received against the board. Each flange has a hole therethrough which is aligned with a respective hole in the board for riveting the connector to the board, which operation requires use of tooling on the opposite side of the board.

U.S. patent application Ser. No. 786,456 filed Oct. 11, 1985, the disclosure of which is hereby incorporated by reference, discloses a connector assembly having drawn rivets for securing the assembly to a printed circuit board. The rivets each have a flange, a tubular shank and a generally conical closed end tapering from the shank to a tip remote therefrom. The shank has elongate slots therein extending substantially parallel to the axis of the shank dividing the shank into segments which join at the closed end. After a rivet is inserted into an aperture in the connector flange it is subjected to axial compression to cause the slots to open as the shank expands radially between the mounting face of the connector flange and the closed end. When the connector assembly is mounted to a printed circuit board, a force is applied axially with respect to the rivet. The conical end provides a lead in to align the rivet with a corresponding aperture in a printed circuit board. As the rivet moves into the printed circuit board aperture the segments of the shank compress radially to comply to the printed circuit board aperture.

It has been found that the insertion force of such a rivet is so great as to be undesirable. Causing the radially inward deflection of the shank segments attached at one end to the shank and at the other end to each other is similar to displacing material in a solid post. It would be desirable to have a rivet having the retention properties of the known rivet but with a lower insertion force.

SUMMARY OF INVENTION

According to the invention, a connector as described above is provided with drawn rivets forming a connector assembly, each having a flange, a tubular shank, and a frustoconical opened end tapering from the shank to a tip remote therefrom. The shank has elongate slots therein which extend substantially parallel the axis of the shank. Each rivet is received in a hole through a respective flange and subjected to axial compression so that the slots open and the shank expands radially between the flange mounting face nd the open end. Tooling prevents the shank segments from forming together at the open end of the rivet. When the connector assembly is mounted to a printed circuit board, the expanded portion of each shank compresses radially with each shank segment acting as a spring member that flexes from its free end up to the juncture with the shank to comply to the printed circuit board hole and the open ended rivet thus provides retention until the rivets and contacts in the connector are soldered to the board.

When the connector is so assembled to the printed circuit board, the open ends of the rivet extend below the board and thus may be readily exposed to a wave soldering simultaneously with any solder tails extending though the board from the connector. The slots in the shank and open end permits solder to flow into the end and the shank. Since any exposed shank will still have a larger diameter than the printed circuit board hole, the solder will thus enhance mechanical retention by preventing collapse of any exposed portion of the shank.

BRIEF DESCRIPTION OF THE DRAWING

FIG. 1 is front perspective of the connector assembly exploded from a printed circuit board;

FIG. 2 is a side perspective view of the boardlock;

FIG. 3 is an end view of the boardlock;

FIG. 4 is a side view of the assembly apparatus:

FIG. 5 is a side view of the lower and upper insertion tool with the boardlock and connector between;

FIG. 6 is a side view of the lower insertion tool and upper forming tool with the assembled connector and boardlock between;

DESCRIPTION OF THE PREFERRED EMBODIMENT

Figure 7:
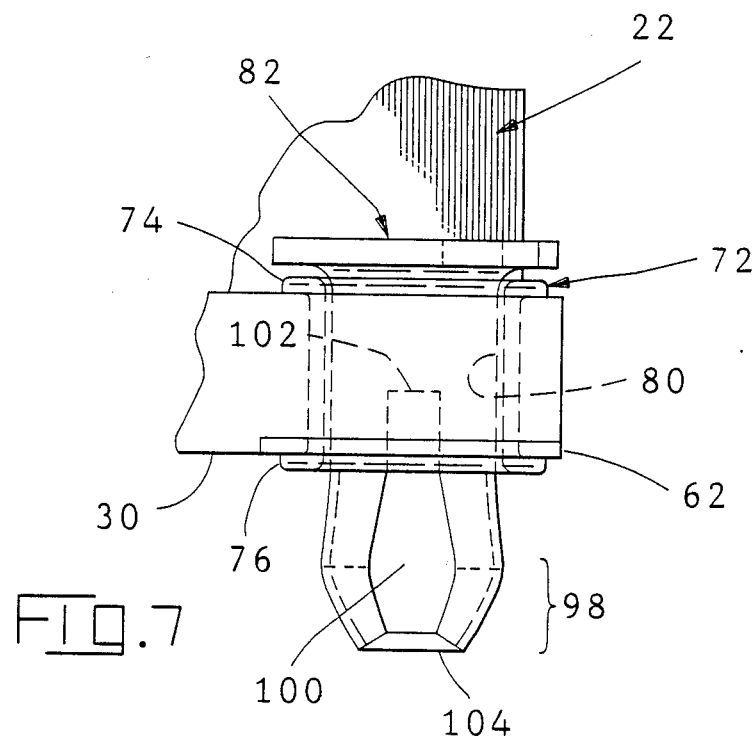
FIG. 7 is a partial end view of the finished connector assembly.

FIG. 1 of the drawing depicts a perspective view of an electrical connector assembly 20 in accordance with the present invention. The connector assembly shown is exemplary and is one of a well known type, namely a subminiature D connector of the type manufactured by the assignee and sold under the trademark AMPLI-MITE.

Connector assembly 20 comprises housing 22 molded of thermoplastic with integral peripheral flange 24, mating face 26, opposed rear face 28 and mounting face 30 at a right angle with respect to mating face 26. A plurality of contact receiving passages 32 extend from mating face 26 rearward toward and open to rear face 28 and have contacts 34 secured therein. Contacts 34 have a mating portion 36 extending into contact receiving passages 32 that typically are pins or sockets and a mounting portion 38, typically solder posts, that extend beyond mounting face 30. Mating face 26 is surrounded by flange 24 having mounting apertures 40 at opposite ends thereof for securing a complementary connector (not shown) thereto.

Electrically conductive shell 42 has a similar outer profile to flange 24 with shell mounting apertures 44 aligned with apertures 40. Lugs 46 on the upper portion of shell 42 fold into recesses 48 on flange 24 to secure shell 42 to housing 22. Shroud 50 extends upward from the flat portion of shell 42 and conforms to, encloses and shields the forward raised portion 52 of housing 22.

Mounting face 30 of connector assembly 20 has integral flanges 54 at opposite ends thereof. Each flange 54 has a coplanar mounting face 30 which is received against a printed circuit board with a channel 56 therebetween provided for flux removal, an opposed holding face 58 and aperture 60 extending therebetween.

Shell 42 has integral ground straps 62 extending to respective mounting faces 30. Ground straps 62 fold into channel 64 such that the lower surface of ground strap 62 is coplanar with mounting face 30, and widens near rear face 28 forming shoulders 66 that engage stops 68 to aid in securing ground strap 62 to housing 22 during unmating of a complementary connector. Apertures 70 in the widened region of ground strap 62 align with apertures 60 in flange 54. Ground straps 62 are secured to respective mounting faces 30 by eyelets 72 received in apertures 60 of flanges 54. Eyelets 72 have first end flange means 74 that engage holding face 58 and second end flange means 76 that engage mounting face 30, or if present, ground strap 62. Eyelets 72 have a generally cylindrical shank 78 extending between end flange means 74 and 76 that fits loosely within apertures 60 as the inside diameter of aperture 60 is slightly greater than the outside diameter of eyelet 72. The interior of shank 78 defines aperture 80 which receives boardlock 82.

Boardlock 82 is received in aperture 80 in an interference fit. The interference fit therebetween does not place undue stress on flanges 54 at the location of apertures 80 as eyelets 72 absorb such stress. In the absence of eyelets 72, boardlock 82 would fit in aperture 60 in an interference fit. Boardlocks 82 extend from coplanar mounting face 30 for a press fit into spaced mounting apertures 84 in printed circuit board 86. Mounting apertures 84 are typically plated through holes that connect with ground traces 88 on the board, whereby the shell 42, if present, is grounded to a common ground thereby providing shielding.

As best seen in FIGS. 2 and 3, boardlock or rivet 82 is deep drawn from a brass disk to form tubular shank 90 extending from an annular flange 92 to an open end 94. Tapering from shank 90 to open end 94 remote therefrom is tapered lead-in surface 96. Tapered lead-in surface 96 and open end 94 thus provide boardlock 82 with a frustoconical tip 98 at the end of shank 90 remote from annular flange 92. Elongate slots 100 extend substantially parallel to the axis of shank 90 from upper end 100 toward end 94 bending into tapered lead-in surface 96, as by skiving. Slots 100 thus form shank 90 into segments 103 which are spring means capable of flexing along the length thereof from the free end 104 to proximate upper end 102 where the segments extend from an unskived portion of boardlock 82. The boardlock or rivet 82 so formed is then typically tin plated.

FIG. 4 is a view of the apparatus 106 used to assemble the boardlock 82 to connector housing 22. The apparatus comprises a frame 108 having a handle 110 pivoted thereto, the handle driving a pivot link 112 which drives vertical link 114 downward toward support 116, thus driving upper insertion tool 118 toward lower insertion tool 120. Referring to FIG. 5, the lower tool 120 is machined from tool steel and comprises a post 122 upstanding from anvil 124, the tool further comprising a collar 1226 and a base 128 with flat 130 thereon to facilitate fixing to support 116. The upper insertion tool 118 has a hole 132 bored in anvil 134 in axial alignment with post 122, the upper insertion tool 118 further comprising collar 136, base 138, and flat 140 to facilitate mounting to vertical link 114.

As shown in FIG. 5, for the first assembly step it is most convenient to partially insert the boardlock 82 into aperture 80 defined by eyelet 72 are closely controlled, a press fit is assured with upper end 102 locating between mounting face 30 and holding face 58. The shank 90 of rivet 82 is then received on post 122 with annular flange 92 against anvil 124, and upper insertion tool 118 is advanced so that anvil 134 bears on connector flange 54 and forces it on boardlock or rivet 82, the open end 94 being received in aperture 132.

With reference to FIG. 6, the next step is to align the connector housing 22, with rivet 82 assembled thereto, between lower tool 120 and an upper forming tool 142 in a like apparatus 106 (FIG. 4). The tool 142 has a formed depression 144, as well as a collar 146, base 148, and flat 150 to facilitate fixing to vertical link 114. The rivet 82 is again received on a post 122 with flange 92 against anvil 124, and the forming tool 142 advanced axially theretoward so that open end 94 is centered in formed depression 144.

The free ends 104 of segments 103 are received between cylindrical protrusion 152 and the tapered wall 154 of formed depression 144. An axial, compressive force is applied to the rivet 82. The axial force causes radial expansion of the shank 78 between the mounting face 30 and open end 94 to form a gradually diverging frustoconical shape, the slots 100 opening slightly to permit the expansion. Tapered lead-in surface 96 may change shape to provide a greater lead-in. Cylindrical protrusion 152 prevents the free ends 104 of segments 103 from being formed to touch each other with segments 103 in an unbiased position. The diameter of cylindrical wall 156 of formed depression 144 is predetermined to provide the desire radial expansion of segments 103. The travel of upper forming tool 142 is determined by adjusting stop 158 on apparatus 106 so that a desired final diameter, greater than the diameter of aperture 80 defined by eyelet 72, is achieved. Boardlock or rivet 82 so formed is somewhat bulbous along segments 103 with the tapered lead-in surface 96 terminating in open end 94 as shown in FIG. 7.

The expanded portion of shank 90 as well as open end 94 will undergo radial collage upon insertion into the space mounting apertures 84 of printed circuit board 86, assuring the good press fit regardless of tolerance deviation the diameter of the space mounting apertures. The free ends 104 of segments 103 deflect inwardly as the connector assembly 20 is placed on printed circuit board 86 and boardlock 82 passes into mounting aperture 84. Each segment acts as a spring member in deflecting along its length from the free ends 104 up to where each segment becomes an integral part shank 90 proximate upper end 102. The free space between free ends 104, as best seen in FIG. 3, permits the segments 103 to deflect inwardly toward the axis of shank 90. Free ends 104 of segments 103 may contact such as when, during insertion, the axis of shank 90 is not aligned with the axis of mounting aperture 84, thereby providing an antioverstress feature.

Figure 8:
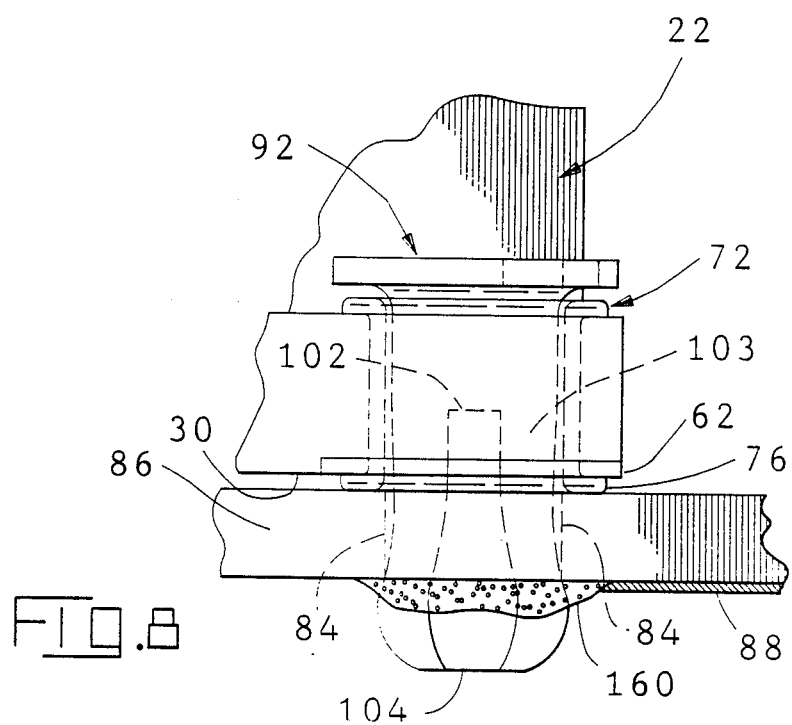
FIG. 8 is an end view of the connector assembly secured to a printed circuit board by solder.

The press fit assures that the connector housing 22 remains solidly anchored to printed board 86 during soldering, which yields the configuration of FIG. 8, where further advantages of the invention appear. Since the lower ends of slots 100 are exposed to the solder bath, solder is drawn into open end 94 and shank 90 as well as to fluxed areas of plating about mounting aperture, thus providing an anchor passing through the rivet 82. Where the open end 94 protrudes sufficiently form printed circuit board 86, the expanded portion will remain larger than mounting aperture 84 due to resiliency, the solder 160 maintaining the larger diameter for additional anchoring.

We claim:
1. An electrical connector assembly for mounting to a printed circuit board comprising:

a dielectric housing defining a mating face adapted for mating with a complementary connector, said housing having a plurality of terminal receiving passages extending from the mating face with terminals secured therein, said housing having an integral flange having a mounting face, an opposed holding face, and a aperture extending therebetween; and a metallic rivet having an axis, said rivet comprising a hollow tubular shank and a frustoconical tip having an open end, said frustoconical tip tapering from the shank to the open end remote therefrom, the shank and frustoconical tip having elongate slots therein, the slots substantially parallel to the axis of the shank and extending along the frustoconical tip, the slots defining in the shank spring means integral at one end with the shank and extending to free ends remote from said one end, the shank being closely received in the aperture, the spring means extending beyond the mounting face to the open end, said spring means gradually diverging from the outer periphery of the shank between the mounting face and the free ends of said spring means to form a substantially frustoconical shape through a first portion of the spring means to form a substantially frustoconical shape, thence gradually converging toward the axis of the shank through a second portion of the spring means between said first portion and the free ends of said spring means, whereby the rivet provides a gradually diverging taper such that upon stuffing of the rivet into a printed circuit board the rivet passes into a rivet receiving aperture of the printed circuit board, and the spring means deflect radially inwardly to pass through a constriction defined by the rivet receiving aperture, then resiliently deflect radially outwardly to secure the connector assembly to the printed circuit board prior to soldering.

2. An electrical connector assembly as recited in claim 1 further comprising an eyelet closely received in said flange to define said aperture, said shank being closely received through said eyelet.

3. An electrical connector as recited in claim 2 wherein said eyelet is a formed metal eyelet.

4. An electrical connector assembly as recited in claim 1, further comprising flange means on said rivet, said flange means extending from the tubular shank and received against the holding face.

5. An electrical connector assembly as recited in claim 1 further comprising a further flange integral with said housing, said further flange having a mounting face coplanar with the mounting face of the integral flange, said further flange having an aperture therein with a like rivet therein.

6. An electrical connector for mounting to a printed circuit board comprising:

a dielectric housing defining a mating face adapted for mating with a complementary connector, said housing having a plurality of terminal receiving passages extending from the mating face with terminals secured therein, said housing having an integral flange having a mounting face, an opposed holding face, and an aperture extending therebetween;

a metallic rivet defining an axis and having a hollow tubular shank, the shank being closely received in the aperture to retain the shank therein, spring means integral at one end with the shank and extending beyond the mounting face to a free open end remote from the shank, said spring means having a first portion and a second portion, said first portion located intermediate the shank and the open end, said first portion gradually diverging from the outer periphery of said shank in the direction from said shank toward said free end to form a substantially frustoconical shape, said second portion located intermediate the first portion and the free end, said second portion gradually converging toward the axis in the direction from the shank toward said free end, whereby when the electrical connector is mounted on a printed circuit board, the spring means pass into a constriction defined by a rivet receiving aperture of the printed circuit board to secure the connector to the printed circuit board prior to soldering.

7. An electrical connector as recited in claim 6 further comprising a further flange integral with said housing, said further flange having a mounting face coplanar with the mounting face of the integral flange, said further flange having an aperture therein with a like rivet therein.

8. An electrical connector as recited in claim 6 further comprising flange means on said rivet, said flange means extending from the tubular shank and received against the holding face.

9. An electrical connector as recited in claim 6 further comprising an eyelet closely received in said flange means to define said aperture, said shank being closely received through said eyelet.

10. An electrical connector as recited in claim 9 wherein said eyelet is a formed metal eyelet.

* * * * *